Aug. 18, 1942.  E. J. PROTIN  2,293,471
TUBE TESTING APPARATUS
Original Filed Feb. 14, 1939  4 Sheets-Sheet 1
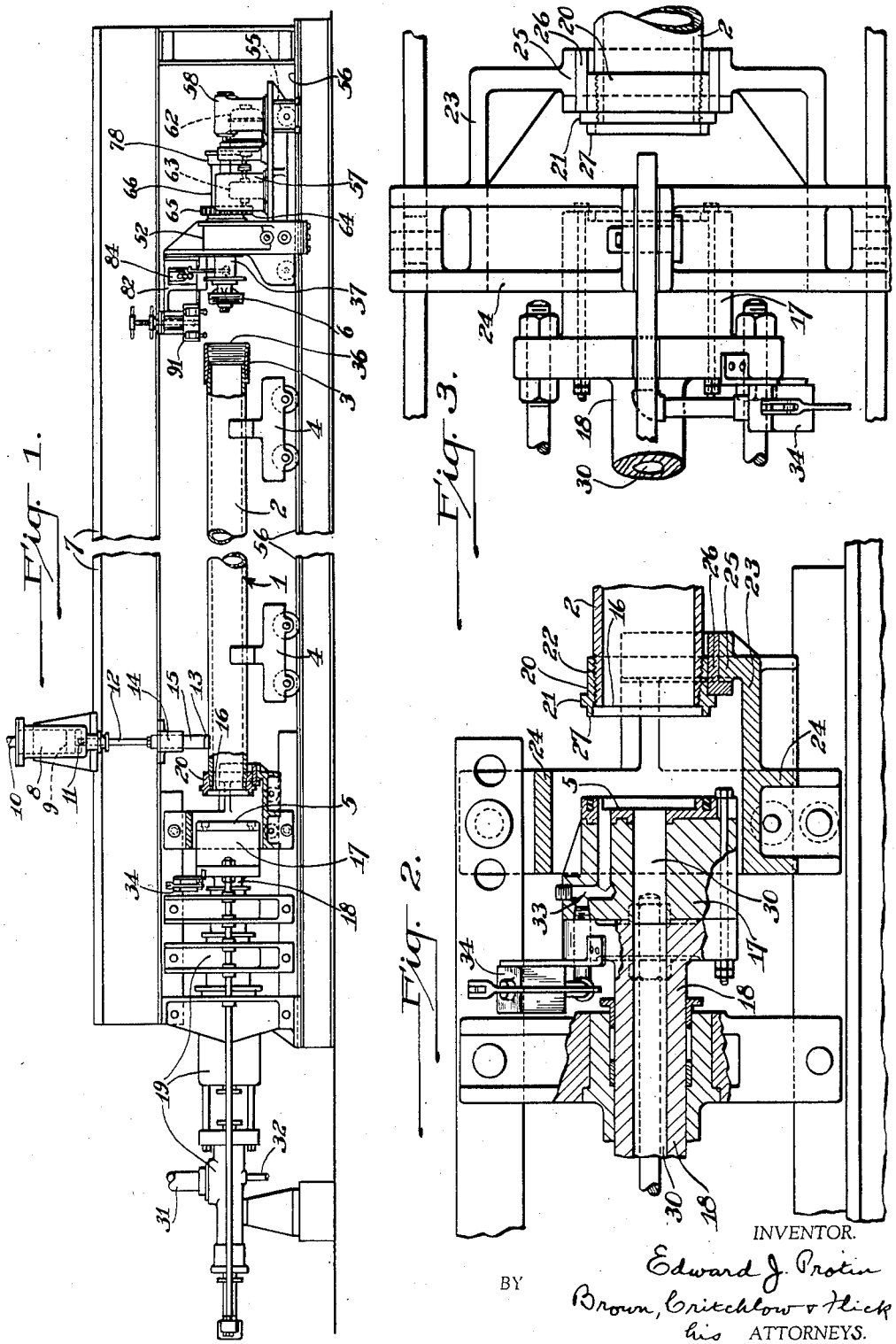
INVENTOR.
Edward J. Protin
BY Brown, Critchlow & Flick
his ATTORNEYS.

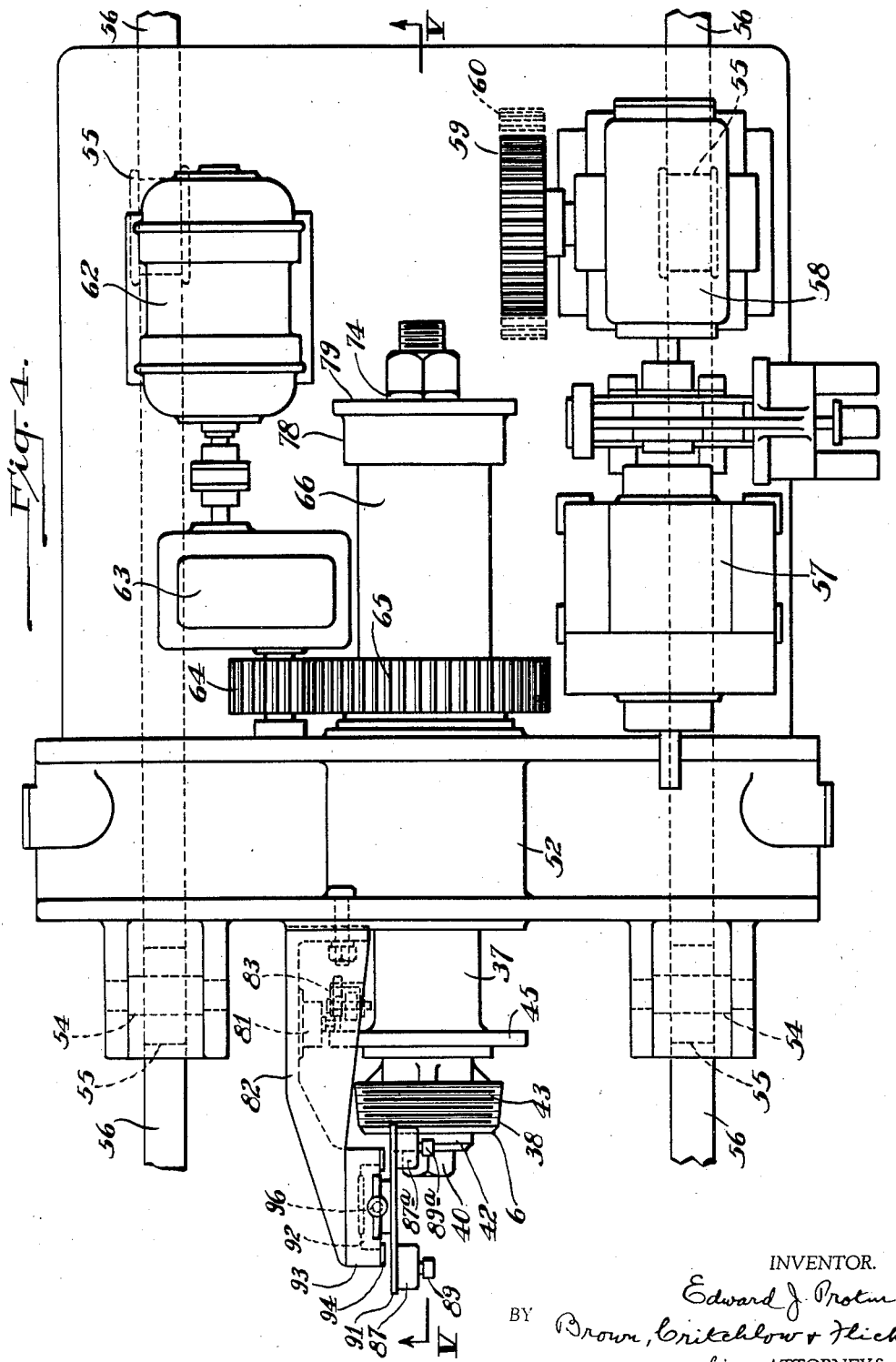

Aug. 18, 1942.    E. J. PROTIN    2,293,471
TUBE TESTING APPARATUS
Original Filed Feb. 14, 1939    4 Sheets-Sheet 3
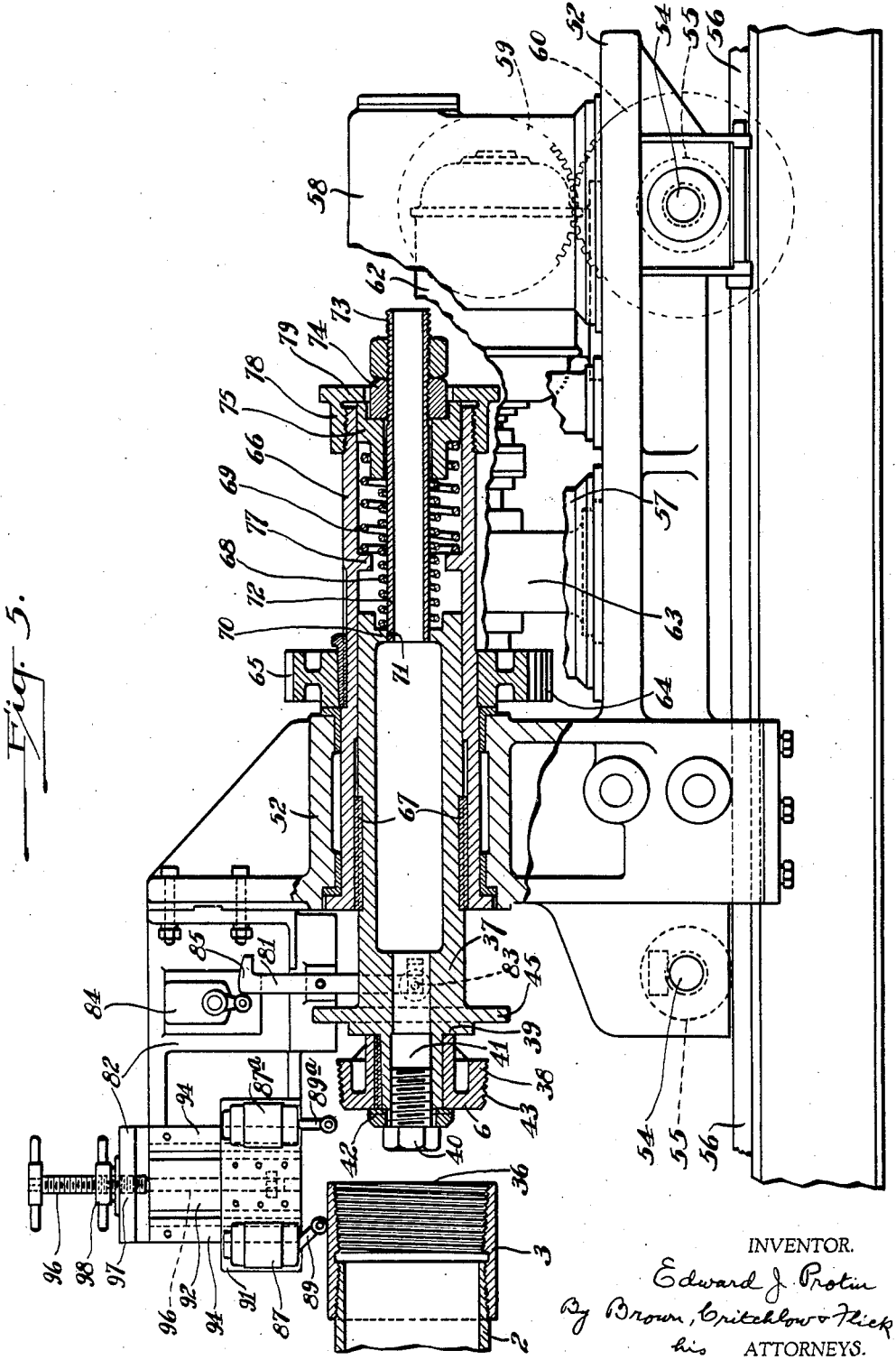
INVENTOR.
Edward J. Protin
By Brown, Critchlow & Flick
his ATTORNEYS.

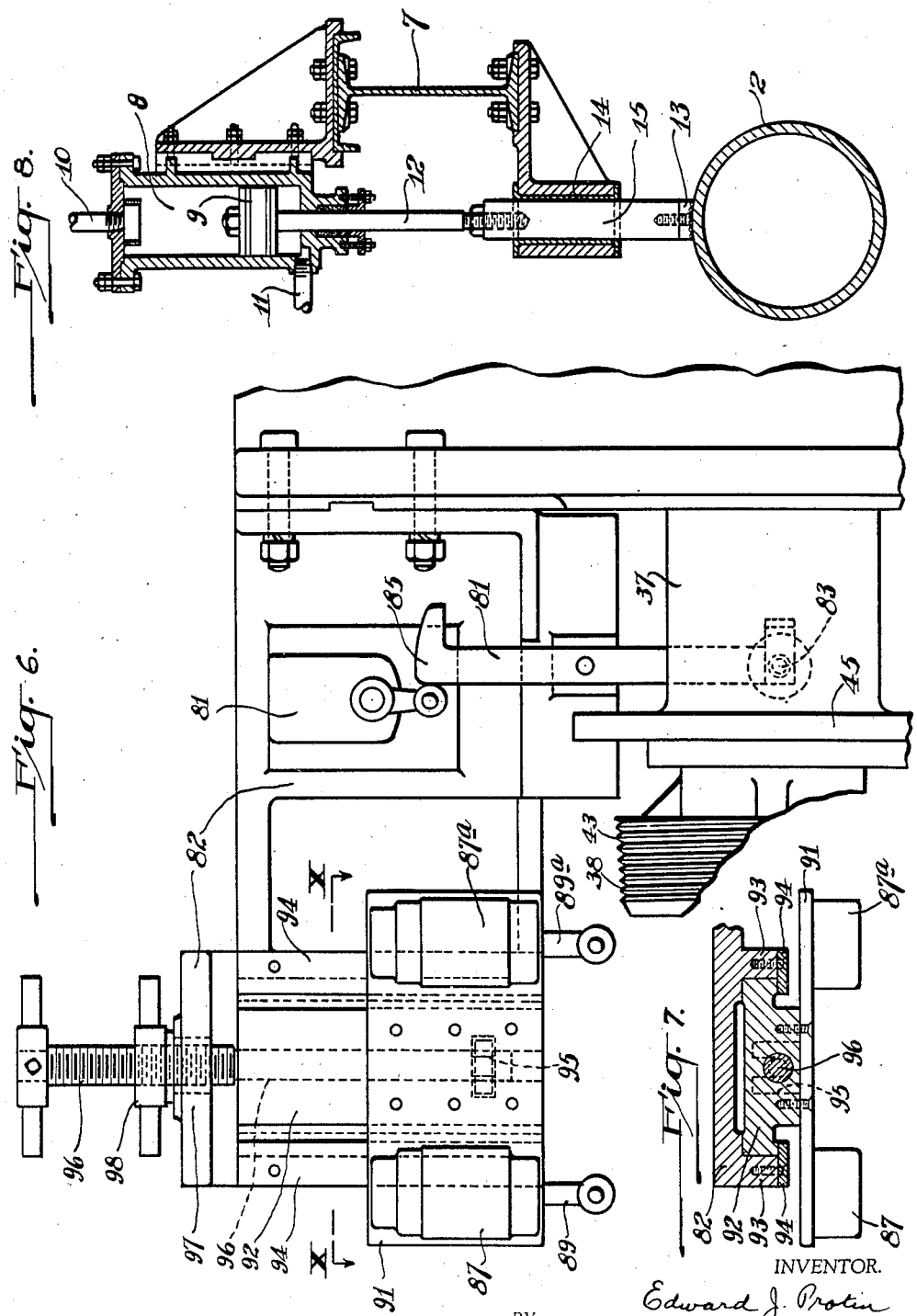
Aug. 18, 1942.   E. J. PROTIN   2,293,471
TUBE TESTING APPARATUS
Original Filed Feb. 14, 1939   4 Sheets-Sheet 4
INVENTOR.
Edward J. Protin
BY Brown, Critchlow & Flick
his ATTORNEYS.

Patented Aug. 18, 1942

2,293,471

UNITED STATES PATENT OFFICE 2,293,471

TUBE TESTING APPARATUS

Edward J. Protin, Charleroi, Pa., assignor to Pittsburgh Steel Company, Pittsburgh, Pa., a corporation of Pennsylvania Original application February 14, 1939, Serial No. 256,265. Divided and this application January 10, 1941, Serial No. 373,952

8 Claims. (Cl. 73—51)

The invention is concerned with apparatus for testing pipe assemblies through the creation of fluid pressure inside of the assembly. This application is a division of my copending patent application Serial No. 256,265, filed February 14, 1939, for Tube testing apparatus, now Patent No. 2,242,658.

Apparatus embodying this invention is usable with various arrangements of pipes and tubes, so that, throughout this specification and in the claims, the phrase "pipe assembly" indicates any test set-up, as, for example, a threaded pipe, or a pipe fitted with a screwed coupling, or two pipes welded together and having outer threaded ends.

Apparatus for the internal pressure-testing of pipe assemblies comprises generally three parts; namely, two sealing heads which form pressure-tight closures for the open ends of the assembly, and a conduit, usually extending through one sealing head, by which fluid and fluid pressure are introduced.

Various ways of tightly engaging each sealing head with its end of the assembly have been proposed. In some the assembly is positioned between two frictional sealing heads, which are then moved toward one another and against the ends of the assembly with such force that a pressure-tight seal between the lip of the assembly and the face of the sealing head results. Although such sealing is positive and permits the application of high testing pressures, disadvantages may inhere in the fact that, while being tested, the pipe assembly is under compression. Thus, for example, when a pipe and screwed coupling are tested, the threads in the joint between them are being forced against one another. On the other hand, in practice this same assembly may transport fluids under these same high pressures while being subjected to high tensional stresses, a notable example being gas well casings, in which a pipe joint may support the entire weight of a long string while being subjected within to high rock gas pressures and without to hydrostatic pressures inherent in a surrounding column of water. It is apparent that pressure tests conducted when the assembly is under high compression are not truly indicative of what its leakage characteristics will be when large tensile stresses are tending to stretch and rupture it.

Other apparatus, designed to eliminate the above disadvantage, provides some self-contained means for engaging the pipe assembly itself and pulling the sealing head into engagement with it. Each engaging mechanism being independent, they may move relative to one another, and, when internal pressure is applied, tend to move apart and to subject the assembly to tension created by outwardly expanding fluid pressure upon the sealing heads themselves. But in the past there has been developed no satisfactory way of engaging this sealing mechanism with the relatively smooth periphery of the pipe assembly. Thus, it has been attempted to frictionally clamp the mechanism upon the periphery of the assembly and pull the sealing head into frictional engagement, as, for example, through the use of opposed pivoted levers whose ends, upon rotation, are wedged into the periphery of the assembly and pull up the sealing head. Although with such means the sealing head may be quickly positioned, the assembly normally presents to the clamping means such limited resistance or purchase that testing pressures of any practicable magnitude either loosen the sealing head or dislodge it entirely. On the other hand, some have provided a threaded member which screws upon the end of the pipe assembly and pulls a frictional sealing head into engagement. Or, in some cases, such threads are placed upon the sealing head, forming a threaded sealing head which itself engages the pipe assembly. Naturally, by this means no sealing head is dislodged or loosened by ordinary pressures, but, in the past, such threaded means or sealing heads have been screwed into place only by hand. Such manual procedure so delays and impedes normal testing that, in the modern plant, where high speed testing is required, the threaded means have found little favor.

In view of these difficulties, it is among the objects of my invention to provide an improved composite machine for pressure-testing pipe assemblies in such manner that they are placed under tension.

Other objects of my invention are apparent in the ensuing description.

In the practice of my invention, I normally use a rotatable spindle whose axis is coincidental with that of the adjacent pipe assembly end, and which is adapted for movement back and forth along this axis. Upon the end of the spindle adjacent the pipe assembly, is located a sealing head which, with each axial movement of the spindle, is either advanced toward or retracted from the assembly. To engage the sealing head with the assembly, I provide threads which are complementary to those upon the assembly end and which are operatively connected to the spindle, as, for example, by being cut directly upon the sealing head, in which case this threaded sealing head is keyed or otherwise fixed upon the spindle, so that upon rotation of the spindle the sealing head is screwed in or out of engagement with the assembly and forms with it a pressure-tight threaded joint. Or, such threads may be connected to the spindle by being cut upon a separate holding member which is keyed or otherwise fixed upon the spindle, in which case rotation of the spindle engages this threaded member whose holding force in turn may be used to hold a frictional sealing head in tight engagement with the assembly. To complete the machine, I provide means for imparting axial movement to the spindle, thus advancing it toward or retracting it from the pipe assembly, and lastly means for rotating the spindle, thus engaging or disengaging the threads and the pipe assembly.

I prefer to use such apparatus in connection with only one end of the assembly, the opposite end being held stationarily in fixed means and closed by the application of an ordinary frictional sealing head. However, one of its ends being free, the assembly as a whole is tensionally tested.

The invention will be further described in connection with this latter type of composite machine, which is disclosed in the accompanying drawings, of which Fig. 1 is an elevation of the machine as a whole; Fig. 2 a vertical central sectional view, partly in elevation, through one sealing head and a portion of its engaging apparatus; Fig. 3 a plan view of this same sealing head and a portion of its accompanying apparatus; Fig. 4 a plan view of the second sealing head and its accompanying apparatus; Fig. 5 a vertical central sectional view along the plane V—V of Fig. 4; Fig. 6 an elevation of speed control apparatus for the second sealing head; Fig. 7 a horizontal section upon the line X—X of Fig. 6; and Fig. 8 a vertical central sectional view through apparatus for holding the pipe assembly in place.

As shown in Fig. 1, my preferred composite machine is about to test a pipe assembly 1, composed of a threaded pipe 2 and a pipe coupler 3. This assembly rests in position upon supporting cradles 4 and is ready to be engaged by sealing heads 5 and 6 and thereafter tested by fluid introduced through sealing head 5.

During tests and while the sealing heads are being engaged, assembly 1 is preferably held firmly in cradles 4 and prevented from rotation. Suitable means, for this purpose, as shown in Figs. 1 and 8, comprise a long frame 7 which extends longitudinally above assembly 1 and supports a vertical cylinder 8 in which there is a reciprocable piston 9 adapted to be driven either upwards or downwards by air pressure or some similar means admitted to cylinder 8 through either inlet 10 or 11. Force imparted to this piston is communicated through a piston rod 12 to a shoe 13 which may thus be forced downwardly onto pipe assembly 1 and held there during the test and engagement and disengagement of the sealing heads. So that shoe 13 may properly seat itself upon assembly 1, a rectangular fixed sleeve 14 surrounds and engages a rectangular portion 15 of piston rod 12, and prevents the shoe from rotating.

As shown in Figs. 1, 2 and 3, sealing head 5 adjacent end 16 of the assembly is of the frictional type, designed to create a seal when merely forced toward assembly 1. This sealing head may be moved toward and away from the assembly by any conventional apparatus. By way of illustration sealing head 5 is shown bolted upon a flanged end 17 of a supported reciprocable piston rod 18 which is connected to suitable pistons and pressure cylinders within mechanism 19. The application of fluid pressure to these pistons forcefully advances or retracts sealing head 5 as the operator may desire.

To maintain assembly end 16 in a fixed longitudinal position during the forceful application of sealing head 5, and preferably to absorb all its thrust, a threaded collar 20, having an outwardly extending lateral flange 21, is tightly screwed upon threads 22 of pipe 2. A yoke 23, supported by and preferably integral with a frame 24, extends beneath collar 20 and is provided with an inwardly extending lateral flange 25 which engages and buttresses flange 21, thus limiting the longitudinal travel of collar 20 and hence of assembly end 16. In order that the same yoke may be used regardless of the outer diameters of assembly 1 and collar 20, a compensating bushing 26 is normally inserted to correctly align the axes of sealing head 5 and assembly 1. Preferably the outer end or lip 27 of collar 20 extends beyond assembly end 16, and this lip rather than the assembly is engaged and sealed by sealing head 5. In this way collar 20 absorbs the entire compressive thrust of the sealing head, while assembly 1 merely rests in the collar and the threaded joint between these two members is tensionally tested, like the rest of the assembly.

As previously stated, testing fluid may be introduced into assembly 1 through either sealing head 5 or 6. Such an inlet through sealing head 5 is illustrated by a conduit 30 which extends back through piston rod 18 and apparatus 19 until it is eventually connected with a suitable source of supply, such as a low pressure fluid inlet 31 and high pressure inlet 32. Moreover, when water, oil, or some other heavy testing fluid is used, suitable means should be provided in either sealing head 5 or 6, or both, for exhausting air from the assembly as testing fluid is introduced. Such means in sealing head 5 are illustrated by an exhaust conduit 33 having at its outer end a valve 34 which may be closed when the assembly has been completely filled with testing fluid. Of course, if air is used as a testing medium, no such exhaust conduit need be provided.

As mentioned above, sealing head 6 is freely movable and closes end 36 of assembly 1 in such manner that the whole assembly is tensionally tested. This result is achieved by supporting the sealing head upon a rotatable and longitudinally movable spindle 37 and by providing threads 38, which are adapted to engage assembly end 36 and are operatively connected to spindle 37 by being cut either upon sealing head 6 itself or upon some holding member associated with spindle 37.

As shown in Figs. 4 and 5, sealing head 6 is keyed upon spindle 37 and is fixed longitudinally of the spindle by a shoulder 39 and by a following bolt 40 screwed into a threaded cavity 41 in spindle 37. A gasket 42 creates a seal between head 6 and following bolt 40. Upon the periphery of this fixed sealing head there are cut external threads 43 which are adapted to engage with internally threaded assembly end 36. When sealing head 6 is advanced and rotated by spindle 37, threads 43 engage the assembly and pull the sealing head into pressure-tight engagement with the internal threads of pipe coupler 3. It is, of course, apparent that sealing head 6 may be integral with spindle 37 or otherwise fixed upon it, the removable head being preferable only because the spindle may then be used in testing various sizes of pipe.

The essential functions of spindle 37, as previously mentioned, require that it be adapted for longitudinal movement along the axis of assembly end 36. In one method of satisfying this requirement, spindle 37 may be supported within a frame which is itself adapted for movement along this axis, and the spindle may be more or less fixed longitudinally of the frame. Accordingly, there is provided, as illustrated in Figs. 4 and 5, a frame 52 which is itself supported upon axles 53 and 54 and wheels 55 for travel back and forth along two rails 56 which are parallel to the axis of assembly end 36, the specific type of means used to support this frame or guide its travel being unimportant. Suitable means for driving frame 52 back and forth may comprise any common source of power, as, for example, an electric motor 57, which, acting through reduction gears 58, gear 59, and pinion 60, rotates axle 54 in either direction. Thus, through the operation of motor 57 spindle 37 may be advanced toward or retracted from assembly 1 along its axis.

Spindle 37 must also be adapted to rotate in either direction upon an axis coinciding with that of assembly 1. Consequently, it is rotatably supported in frame 52 and is selectively rotated by any common source of power, preferably located upon frame 52, as, for example, an electric motor 62 which, acting through reduction gears 63 and pinion 64, rotates a gear wheel 65 which in turn is operatively connected with and rotates spindle 37.

Since spindle 37 is supported in frame 52, its longitudinal speed toward or away from pipe assembly 1 is normally identical with that of this frame. But as long as threads 43 engage or are in contact with the threads upon pipe assembly 1, and while they are being screwed in or out, the longitudinal speed of spindle 37 is limited by the rate at which these threads are engaged with or disengaged from the pipe assembly. In other words, the spindle should adapt itself to the speed at which the threads move in or out of the assembly 1, a speed determined by the thread pitch and the rotational speed of the spindle. If motors 57 and 62 were so synchronized that frame 52 would always travel at longitudinal speeds equal to those at which threads 43 are screwed in or out of assembly 1, spindle 37 could have a fixed position longitudinally of the frame. But since such synchronization is difficult to achieve, it is preferable to provide some means for allowing longitudinal play between spindle 37 and frame 52. Apparatus suitable for the purpose comprises a sleeve 66 which, journaled in frame 52, is rotatable upon the axis of assembly end 36 and which surrounds and telescopically receives spindle 37 in such fashion that spindle 37 rotates with sleeve 66 and may move longitudinally with respect to it. As shown, these two members are cylindrical and are keyed together by a key 67, but, so long as they are joined for rotation while relative longitudinal travel between them is permitted, their meeting surfaces may describe any desired shapes, as, for example, the outer surface of spindle 37 and the inner surface of sleeve 66 may be octagonal. When sleeve 66 is used, gear wheel 65 is keyed or otherwise connected to it, so that motor 62 acts through the sleeve and positively drives spindle 37. With the apparatus thus provided, sleeve 66 is advanced or retracted with frame 52, but, since spindle 37 is adapted to slide in and out of the sleeve, the spindle and frame need not move in exact accordance with one another. Consequently, if the speed of frame 52 differs from the longitudinal rate at which threads 43 are traveling with respect to assembly 1, the frame and spindle merely compensate for this difference by movement relative to one another.

For smooth operation and especially in view of certain automatic controls to be described hereinafter, it is desirable to provide means which tend to force spindle 37 into a definite longitudinal position relative to sleeve 66, but which allow it to travel away from this position in either direction. While various forms of apparatus may be used, I preferably use two springs 68 and 69 which combine to govern the position of spindle 37, one or the other spring being compressed when the spindle moves away from this position. To engage spring 68, spindle 37 is provided with a suitable buttress 70, such as an inwardly extending flange. Extending beyond buttressing flange 70 and rigidly connected to spindle 37, as, for example, by a welded joint 71, is a tensional member 72, in the form of a tube, of suitable size and shape to withstand the expansive force of spring 68. Upon the outer end 73 of this tube is located a second spring buttress 74, such as a nut screwed upon the tube, and between this buttressing nut and spring 68 is placed a movable bearing block 75 which may be in the form of a collar surrounding tube 72. Thus spring 68 tends continuously to hold bearing block 75 in a fixed longitudinal position against nut 74. To engage spring 69, sleeve 66 is similarly provided with a buttress 77, such as an inwardly extending flange, which is so proportioned and positioned that, during the normal play of spindle 37, it is contacted by neither flange 70 nor bearing block 75. Also the outer end of sleeve 66 is provided with another spring buttress, such as a follower 78 which is screwed upon the sleeve and terminates in an inwardly extending flange 79 adapted to engage and limit the longitudinal movement of bearing block 75. Thus spring 69 continuously tends to force bearing block 75 against limiting flange 79. Consequently, since bearing block 75 normally rests against limiting flange 79 and since, under the action of spring 68, buttressing nut 74 normally rests against bearing block 75, spindle 37 is normally held in one longitudinal position, relative to sleeve 66, although, of course, the position may be adjusted or changed by varying the setting either of nut 74 or follower 78.

With the apparatus thus explained, spindle 37 may travel in either direction from the position shown in Fig. 5. If, for example, frame 52 stops, while threads 43 are still being engaged with assembly 1, spindle 37 is pulled out of sleeve 66 and nut 74 pulls bearing block 75 toward flange 77, compressing spring 69. On the other hand, if frame 52 advances at a greater speed than that at which threads 43 are being engaged, spindle 37 is forced further into sleeve 66, while spring 68 is compressed.

Although the operator might himself control motors 57 and 62 with sufficient accuracy to engage and disengage sealing head 6, controls which automatically stop the rotation of spindle 37 when threads 43 are sufficiently engaged, and which automatically control the movements of frame 52, are desirable. The existence of a sufficiently tight engagement between threads 43 and assembly 1 may be indicated by the existence of a given load upon motor 62, and the motor stopped when this load is achieved.

Controls suitable for governing the movements of frame 57 are shown in Figs. 4, 5, 6 and 7. In the first place, it is desirable that the travel of frame 52 be altogether stopped when it attains a specific position, relative to spindle 37, for frame 52 moves up upon the spindle as soon as threads 43 are fully engaged, and whenever the rate at which threads 43 are engaged is considerably less than the speed of frame 52. To protect the machine, it is therefore desirable that frame 52 be stopped whenever spindle 37 is forced back into sleeve 66 and frame 52 a given amount. To utilize such relative movement for purposes of control, I preferably provide a lever 81 which is pivoted upon an auxiliary frame 82 extending from frame 52 and whose lower end 83 is engaged and rotated by some part of spindle 37, as, for example, lateral flange 45, whenever the spindle is forced from its normal position toward frame 52. The rotary movement thus imparted to lever 81 may be variously applied to bring frame 52 to a halt. Merely by way of example, I have shown a limit switch 84 which is supported upon auxiliary frame 82 and is tripped by the upper end 85 of lever 81. This switch, being in series with the electrical power circuit leading to motor 57, cuts off that power and stops the frame. Thus, if frame 52 is traveling faster than threads 43 are being engaged with assembly 1, spindle 37 is telescoped into sleeve 66 until lever 81 is caused by flange 45 to trip switch 84. Thereupon, motor 57 and frame 52 stop, until, by the continued engagement of threads 43, spindle 37 is pulled back to its normal position. Usually, however, threads 43 will be fully engaged before the spindle reaches this position.

To speed up testing, it is desirable that frame 52 travel through most of its course at a greater speed than that at which threads 43 should first contact assembly 1. Consequently to protect those threads, provision is made for reduction in the frame speed before this contact is made. Suitable controls for effecting this reduction comprise movable means which are supported upon frame 52 and strike against and are actuated by assembly end 36 as frame 52 advances toward it. As an example, I have shown a two-stage reduction through the use of two limit switches 87 and 87a, which are supported upon auxiliary frame 82 and whose protruding arms 89 and 89a are tripped by assembly end 36 as they are advanced toward it by frame 52. The switches so operated then act through electrical circuits, as by placing more resistance in the field of motor 57, to slow down motor 57 and frame 52. Of course, other types of valves or switches might be substituted and the stages of reduction may be varied as the operator may desire, by increasing or decreasing the number of switches.

In order that these same movable means or switches may be utilized with pipe assemblies of varying diameter, they are preferably not attached directly to auxiliary frame 82 but are located upon a plate 91 which is movable relative to the axis of pipe assembly 1. This plate is removably attached to an elevator 92 which slides between two vertical ribs 93 upon frame 82 and is held in place by two gimping plates 94. Elevator 92 itself depends, by means of a notch and pin connection 95, from a rotatable rod 96 which is itself raised or lowered upon rotation through the action of a threaded connection 97 between itself and frame 82. A lock nut 98 then fixes rod 96 in any desired position. Thus by rotating rod 96, the operator may raise or lower switches 87 and 87a to compensate for differences in the size of assembly 1.

If sealing head 6 is positioned as shown in Fig. 1, the operator may quickly engage it with the apparatus thus described, by merely starting motors 57 and 62. Under the action of motor 57, frame 51 is quickly advanced toward assembly end 36 until, as shown in Fig. 5, the rotatable arm 89 of switch 87 is forced against the assembly and tripped. This operation of the switch results in a speed reduction and frame 52 continues at this speed until the rotatable arm 89a of switch 87a is in turn forced against the assembly and tripped. From there on frame 52 proceeds at a speed at which it is safe for threads 43 to contact assembly end 36. Meanwhile, under the action of motor 62, spindle 37 is rotating threads 43 and the moment assembly end 36 is contacted these threads begin to engage. Since frame 52 normally travels faster than the rate at which threads 43 are being engaged, spindle 37 is telescoped further into sleeve 66, spring 68 is compressed, and lever 81 is engaged and rotated somewhat by flange 45. When frame 52 has gained sufficient ground upon spindle 37, switch 84 is tripped and the frame stops. Lastly, when threads 43 are tightly engaged, spindle 37 ceases to rotate.

To disengage sealing head 6, the operator throws switches which allow motors 57 and 62 to operate in the reverse direction. Motor 62 starts immediately, spindle 37 is rotated and threads 43 begin slowly backing out of assembly end 36. Meanwhile, motor 57 backs frame 52 away at its slowest speed, and, although it may gain ground upon the spindle and compress spring 69, sufficient leeway between flange 71 and bearing block 75 is provided to allow threads 43 to be completely disengaged before spring 69 is entirely compressed. As frame 52 continues to back away, arm 89a passes beyond assembly end 36 and drops back into its original position, whereupon, through electrical or mechanical connections the speed of motor 57 increases and the frame speed is stepped up. Finally, as arm 89 passes beyond assembly end 36, the retraction speed is raised to full.

With the apparatus thus described, pipe assembly 1 is tested throughout its entire length while under tension simulating its conditions of service. Assembly end 16 is fixed stationarily by collar 20, while the internal pressure of the testing fluid against freely movable sealing head 6 tends to stretch the pipes and joints of which the assembly is composed. Even threads 22 which engage collar 20 and the threads of assembly end 36 are tested under tension. Moreover, when desirable, this tension may be increased by energizing motor 57. It will also be noted that sealing heads 5 and 6 are firmly engaged and can not be dislodged by any normal testing pressures. Especially is this true of sealing head 6, which, in each above-described embodiment, is held in place by a positive threaded engagement with the assembly.

According to the provisions of the patent statutes, I have explained the construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a machine for internal pressure-testing under tension of threaded pipe assemblies having temporarily sealed ends, apparatus for effecting said sealing of one threaded end of a pipe assembly and comprising a collar adapted to be screwed into engagement with said threaded end, means for engaging said collar and limiting its movement in the direction of the assembly, and a friction sealing head adapted to be moved into pressure-tight engagement with the outer end of said collar without stressing the pipe threads; floating means for effecting the sealing of the opposite end of the pipe assembly whereby axial stretching of the assembly is permitted; and means for introducing fluid under pressure into the pipe assembly to test the latter.

2. In a machine for internal pressure-testing under tension of threaded pipe assemblies having temporarily sealed ends, apparatus for effecting said sealing of one threaded end of a pipe assembly and comprising a collar adapted to be screwed into engagement with said threaded end, said collar being encircled by a flange, means for engaging said flange to limit movement of the collar in the direction of the assembly, and a friction sealing head adapted to be moved into pressure-tight engagement with the outer end of said collar without stressing the pipe threads; floating means for effecting the sealing of the opposite end of the pipe assembly whereby axial stretching of the assembly is permitted; and means for introducing fluid under pressure into the pipe assembly to test the latter.

3. In a machine for internal pressure-testing under tension of threaded pipe assemblies having temporarily sealed ends, apparatus for effecting said sealing of one threaded end of a pipe assembly and comprising a collar adapted to be screwed into engagement with said threaded end, a yoke mounted in stationary position and formed for receiving said collar and limiting its movement in the direction of the assembly, a friction sealing head, and means for moving said sealing head into pressure-tight engagement with the outer end of said collar without stressing the pipe threads; floating means for effecting the sealing of the opposite end of the pipe assembly whereby axial stretching of the assembly is permitted; and means for introducing fluid under pressure into the pipe assembly to test the latter.

4. In a machine for internal pressure-testing under tension of threaded pipe assemblies having temporarily sealed ends, apparatus for effecting said sealing of one threaded end of a pipe assembly and comprising a collar adapted to be screwed into engagement with said threaded end, a yoke provided with an opening for receiving said collar and limiting its movement in the direction of the assembly, a removable bushing in said yoke opening, a friction sealing head, and means for moving said sealing head into pressure-tight engagement with the outer end of said collar without stressing the pipe threads; floating means for effecting the sealing of the opposite end of the pipe assembly whereby axial stretching of the assembly is permitted; and means for introducing fluid under pressure into the pipe assembly to test the latter.

5. In a machine for internal pressure-testing under tension of threaded pipe assemblies having temporarily sealed ends, apparatus for effecting said sealing of one threaded end of a pipe assembly and comprising a collar adapted to be screwed into engagement with said threaded end, means for engaging said collar and limiting its movement in the direction of the assembly, a member movable axially of the pipe assembly, and a friction sealing head detachably mounted on the end of said member adjacent said assembly and adapted to be moved by said member into pressure-tight engagement with the outer end of said collar without stressing the pipe threads; floating means for effecting the sealing of the opposite end of the pipe assembly whereby axial stretching of the assembly is permitted; and means for introducing fluid under pressure into the pipe assembly to test the latter.

6. In a machine for internal pressure-testing under tension of threaded pipe assemblies having temporarily sealed ends, apparatus for effecting said sealing of one threaded end of a pipe assembly and comprising a collar adapted to be screwed into engagement with said threaded end, means for engaging said collar and limiting its movement in the direction of the assembly, and a friction sealing head provided with a fluid inlet passage therethrough and adapted to be moved into pressure-tight engagement with the outer end of said collar without stressing the pipe threads; floating means for effecting the sealing of the opposite end of the pipe assembly whereby axial stretching of the assembly is permitted; and means for delivering fluid under pressure to said inlet passage to test the pipe assembly.

7. In a machine for internal pressure-testing under tension of threaded pipe assemblies having temporarily sealed ends, apparatus for effecting said sealing of one threaded end of a pipe assembly and comprising a collar adapted to be screwed into engagement with said threaded end, means for engaging said collar and limiting its movement in the direction of the assembly, a friction sealing head provided with a liquid inlet passage and an air outlet passage therethrough, and a valve for said air outlet passage, said head being adapted to be moved into pressure-tight engagement with the outer end of said collar without stressing the pipe threads; floating means for effecting the sealing of the opposite end of the pipe assembly whereby axial stretching of the assembly is permitted; and means for delivering fluid under pressure to said liquid inlet in order to test the pipe assembly.

8. In a machine for internal pressure-testing under tension of threaded pipe assemblies having temporarily sealed ends, apparatus for effecting said sealing of one threaded end of a pipe assembly and comprising sealing means adapted to be moved axially of said assembly and to be screwed into engagement with said threaded end, and means for engaging said sealing means and limiting its movement in the direction of the assembly, whereby said threaded end is sealed without requiring any of the pipe to be placed under compression; floating means for effecting the sealing of the opposite end of the pipe assembly whereby axial stretching of the assembly is permitted; and means for introducing fluid under pressure into the pipe assembly to test the latter.

EDWARD J. PROTIN.